United States Patent [19]

Stohlquist

[11] Patent Number: 5,044,876
[45] Date of Patent: Sep. 3, 1991

[54] APPARATUS FOR FORMING AND TRANSFERRING GROUPS OF ARTICLES

[75] Inventor: Roger H. Stohlquist, Rockford, Ill.

[73] Assignee: APV Crepaco, Inc., Rockford, Ill.

[21] Appl. No.: 517,929

[22] Filed: May 2, 1990

[51] Int. Cl.$^5$ .......................................... B65G 57/11
[52] U.S. Cl. ........................ 414/798.2; 414/798.8; 414/790.4; 53/542; 198/419.3
[58] Field of Search ............... 414/798.2, 798.6, 798.7, 414/798.8, 790.2, 790.3, 790.4, 791; 53/542, 438, 443; 198/419.3, 468.4

[56] References Cited

U.S. PATENT DOCUMENTS

| | | | |
|---|---|---|---|
| 2,925,926 | 2/1960 | Packman et al. | 414/790.4 |
| 3,662,875 | 5/1972 | Solomon | 198/419.3 |
| 3,682,329 | 8/1972 | Dean | 414/790.2 X |
| 3,876,083 | 4/1975 | Evans et al. | 414/798.2 |
| 3,902,587 | 9/1975 | Checcucci | 198/419.3 |
| 3,924,758 | 12/1975 | Gram | 414/798.6 |
| 4,053,066 | 10/1977 | Lynch . | |
| 4,130,480 | 12/1978 | Loewesthal | 209/551 |
| 4,176,993 | 12/1979 | Luginbuhl | 414/798.2 |
| 4,250,688 | 2/1981 | Lingenfelder | 53/542 X |
| 4,505,093 | 3/1985 | Johnson | 53/542 X |
| 4,530,435 | 7/1985 | Stohlquist | 209/592 |
| 4,645,062 | 2/1987 | Kopp . | |
| 4,744,201 | 5/1988 | Total et al. | 198/419.3 X |
| 4,768,642 | 9/1988 | Hunter | 198/419.3 X |

FOREIGN PATENT DOCUMENTS

542228 12/1941 United Kingdom ............. 198/468.4

Primary Examiner—Frank E. Werner
Assistant Examiner—Brian K. Dinicola
Attorney, Agent, or Firm—Vernon J. Pillote

[57] ABSTRACT

Apparatus for assembling articles in succession into horizontal groups of sidewise adjacent articles and for transferring the article groups to an unloading station. The apparatus includes a feed conveyor for feeding articles in succession to an article loading station, an endless pusher conveyor having an upper run extending forwardly along a generally horizontal path from the article loading station to a group unloading station, and first and second endless type control conveyors each having an upper run extending forwardly along the generally horizontal path from the loading station past the unloading station. The first group control is driven to advance a lead article control finger along the path away from the loading station as the feed conveyor feeds successive articles of a first group to the loading station and, when a number of articles comprising the first group of articles has been fed to the loading station, the pusher conveyor and the first group control conveyor are driven to advance the first group of articles along the path to the unloading station. The second group control conveyor is driven to advance an article control finger along the path away from the loading station as the feed conveyor feeds successive articles of the next succeeding group to the loading station and, when a number of articles comprising the next succeeding group of articles has been fed to the loading station, the pusher conveyor and the second control conveyor are driven to advance the next succeeding group of articles along the path to the loading station.

22 Claims, 7 Drawing Sheets

APPARATUS FOR FORMING AND TRANSFERRING GROUPS OF ARTICLES

BACKGROUND OF THE INVENTION

Various apparatus have heretofore been provided for forming and transferring groups of articles. Some prior apparatus receive articles in succession and stack the articles in vertically arranged groups. Some others receive articles in succession and assemble the articles in a generally horizontally extending row. When thin or flat articles are assembled in a generally horizontally extending row, problems are presented in properly supporting the articles on edge during assembly of successive articles into a group, and during transfer of the group of articles to a subsequent station. Further, some articles such as confection bars and frozen confections can be easily deformed or crushed and it is important to limit the forces and pressures which are applied to the articles during assembly of the articles into groups and transfer of the groups to a subsequent station to prevent damaging the articles. In general, these problems are aggravated as the operational speed of the group forming and transferring apparatus is increased.

SUMMARY OF THE INVENTION

The present invention relates to an apparatus for assembling articles in succession into a generally horizontal group of sidewise adjacent articles and for transferring the group to an unloading station.

It is the general object of the present invention to provide an apparatus of the type described, having an improved arrangement for supporting the articles as they are assembled in succession into a group and during transfer of the group of articles to a subsequent unloading station and which can operate at relatively high speeds and which minimizes the forces applied to the articles during assembly and transfer of the group.

Accordingly, the present invention provides a feed conveyor for feeding articles in succession to an article loading station, an endless type pusher conveyor having an upper run extending forwardly along a generally horizontal path from an article loading station to a group unloading station and first and second endless type control conveyors each having an upper run extending forwardly along the generally horizontal path from the loading station past the unloading station. The pusher conveyor has a plurality of article pushers at spaced locations therealong and the first and second group control conveyors each have at least one lead article control finger thereon. The first group control conveyor is driven to advance a lead article control finger along the path away from the loading station as the feed conveyor feeds successive articles of a first group to the loading station and, when a number of articles comprising the first group of articles has been fed to the loading station, the pusher conveyor and the first group control conveyor are driven to advance the first group of articles along the path to the unloading station. The second group control conveyor is driven to advance an article retainer thereon along the path away from the loading station as the feed conveyor feeds successive articles of the next succeeding group to the loading station and, when a number of articles comprising the next succeeding group of articles has been fed to the loading station, the pusher conveyor and the second group control conveyor are driven to advance the next succeeding group of articles along the path to the loading station.

A sensor senses articles on the feed conveyor as they are being fed to the loading station and the control conveyor drive is arranged to advance the associated control conveyor along the path a distance to maintain a lead article control finger at the front side of the lead article in a group as successive articles are deposited at the loading station.

The article pushers on the pusher conveyor are spaced apart along the pusher conveyor a distance such that one article pusher is at the inlet side of the loading station when a preceding article pusher is at the inlet side of the unloading station so that one article pusher is in position to advance the group as soon as the last article of the group has been deposited at the loading station. The lead article control fingers are spaced apart along the associated control conveyor a distance greater than the spacing of the pusher fingers on the pusher conveyor so that the lead article control fingers can move past the group unloading station during transfer of article groups.

Article groups are advantageously discharged from the loading station by a vacuum type group transfer head mounted for movement between a group load position spaced above the unloading station and a group discharge position laterally offset from the unloading station, and a group of articles at the unloading station is raised into engagement with the group transfer head by a group lifting mechanism.

DETAILED DESCRIPTION

The apparatus for assembling articles into groups and for advancing the groups of articles is best shown in FIGS. 1-4. In general, the apparatus includes a feed conveyor designated generally FC, driven in continuous fashion to feed articles in succession to an article loading station designated LS; and endless type pusher conveyor means designated generally PC having an upper run extending forwardly along a generally horizontal path from the article loading station to a group unloading station US, and endless type first and second group control conveyors designated generally CC1 and CC2, each having an upper run extending forwardly along the generally horizontal path from the loading station past the unloading station.

Figure 1:
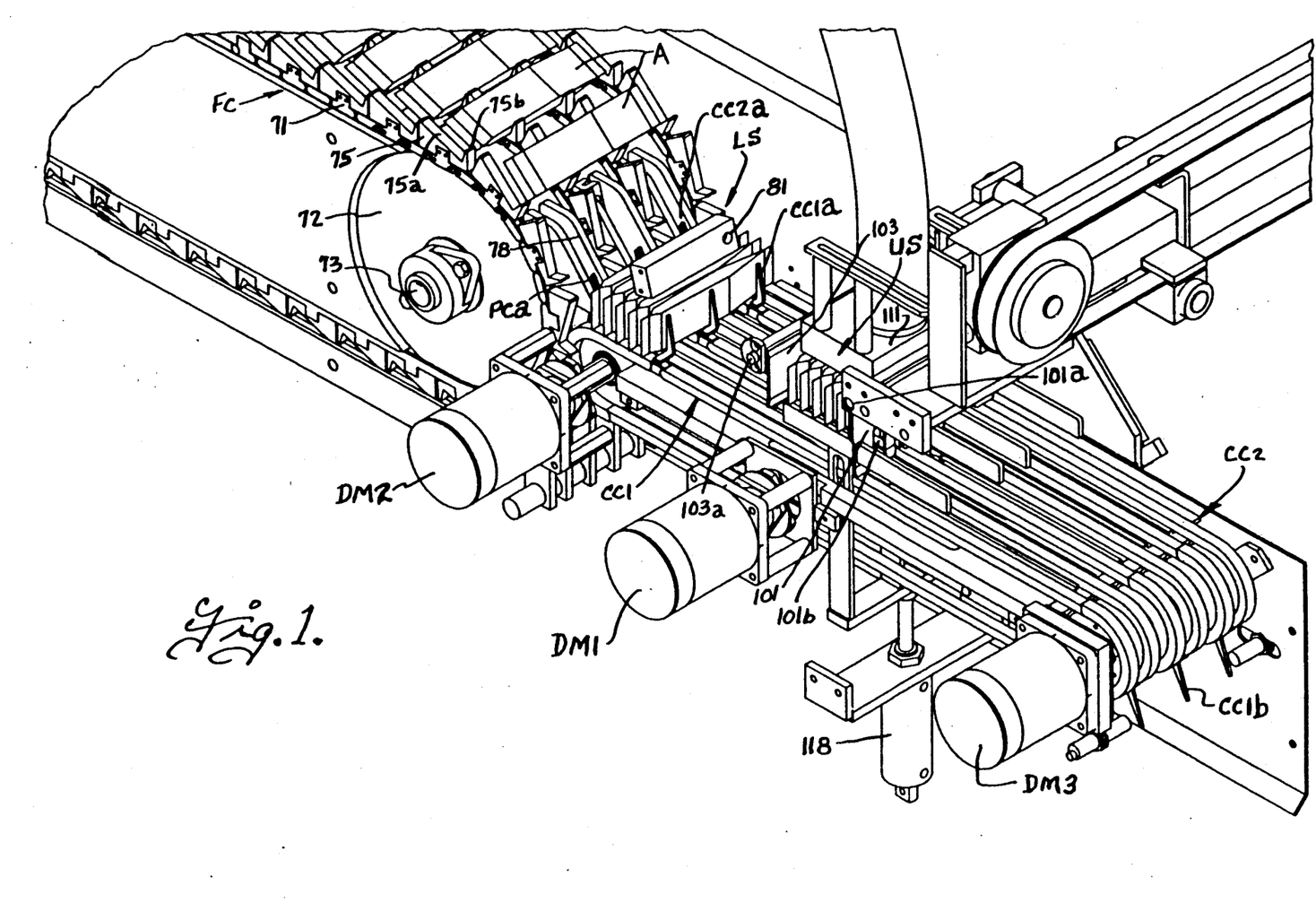
FIG. 1 is a fragmentary isometric view of the group forming and transfer apparatus of the present invention.
Figure 2:
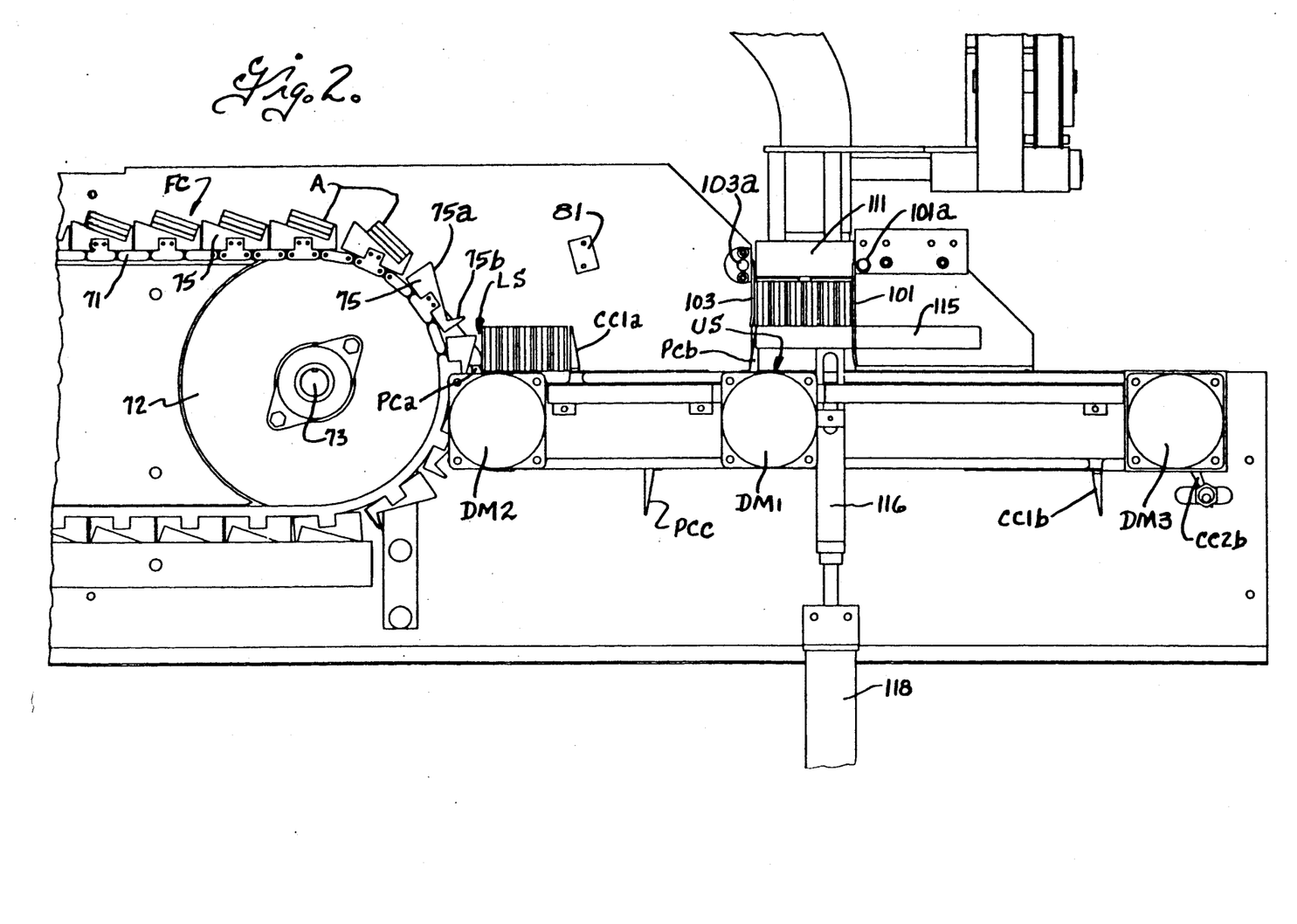
FIG. 2 is a fragmentary side elevational view of the group forming and transfer apparatus.
Figure 4:
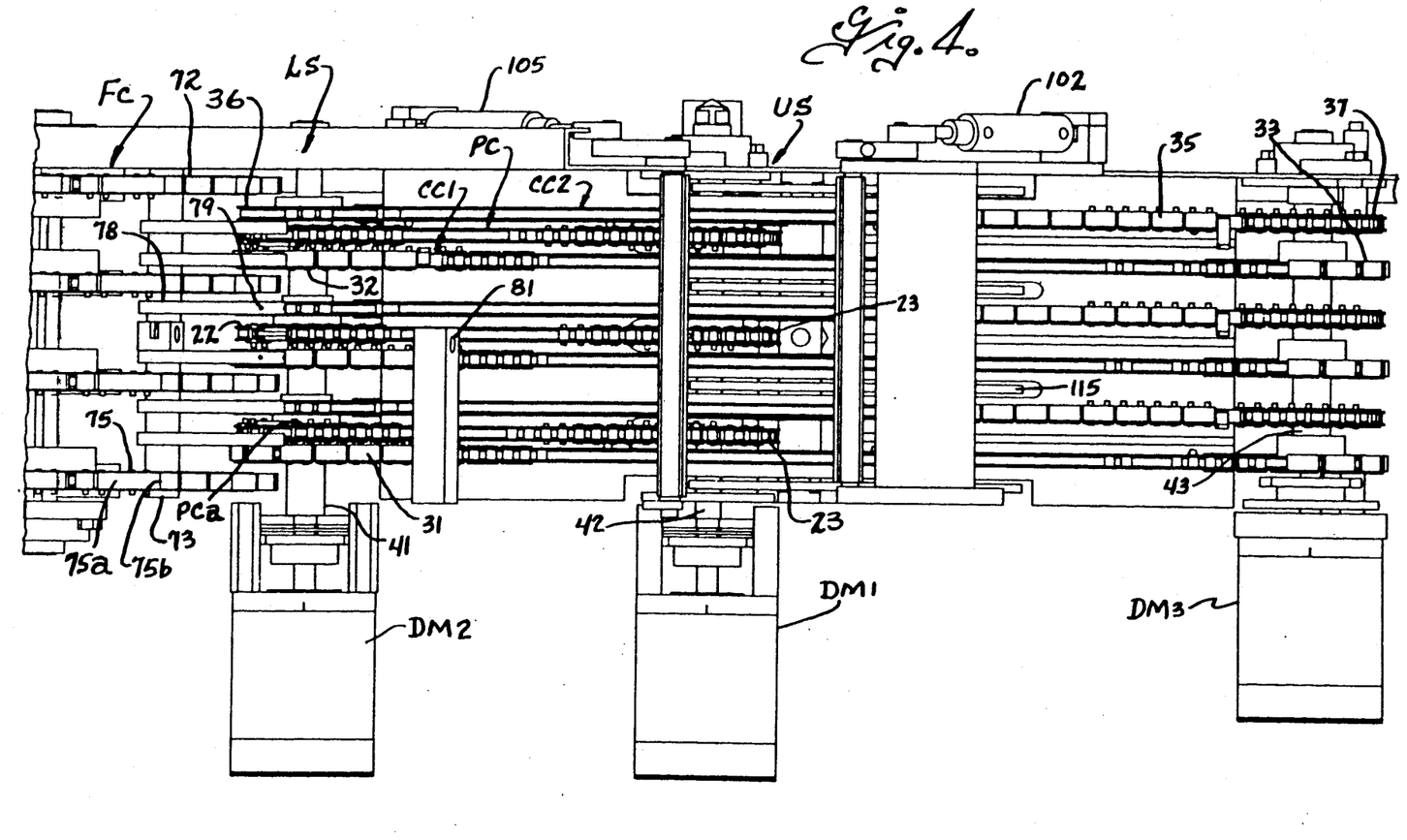
FIG. 4 is a fragmentary top view of the group forming and transfer apparatus.

As best shown in FIG. 4, the endless type pusher conveyor PC comprises a set of three endless chains each entrained over inlet and outlet sprockets 22 and 23. The first endless type group control conveyor CC1 also comprises a set of three endless chains each entrained over inlet and outlet sprockets 32 and 33 and the second endless type control conveyor CC2 includes a set of three endless chains entrained over inlet and outlet sprockets 36 and 37. The inlet sprockets 22 of the pusher conveyor and the inlet sprockets 32 and 36 of the first and second control conveyors are disposed coaxially with each other along a shaft 41 adjacent to and below the loading station LS. The outlet sprockets 23 of the pusher conveyor are disposed coaxially with each other along a shaft 42 adjacent to and below the unloading station US and the outlet sprockets 33 and 37 of the first and second control conveyors are disposed coaxially along a shaft 43. The outlet sprockets 23 of the pusher conveyor PC are fixed to the shaft 42 for rotation therewith and are driven by a drive means designated DM1. The sprockets of one of the control conveyors such as the inlet sprockets 32 of the control conveyor CC1 are fixed to the shaft 41 for rotation therewith and driven by a second drive means designated DM2. The inlet sprockets 22 of the pusher conveyor and the inlet sprocket 36 of the other control conveyor CC2 are mounted on the shaft 41 for rotation relative thereto and relative to each other. The outlet sprockets 37 of the control conveyor CC2 are fixed to the shaft 43 for rotation therewith and driven by a third drive means designated DM3. The outlet sprockets 33 control conveyor CC1 are supported on the shaft 43 for rotation relative thereto and relative to the outlet sprockets 37 of control conveyor CC1. The chains of the pusher conveyor PC have a generally horizontal upper run extending between the inlet and outlet sprockets 22 and 23 and a lower return run and a plurality of article pushers, preferably three in number and designated PCa, pCb and PCc as best shown in FIG. 2. The article pushers are arranged to engage the trail side of the last article in a group and push the group from the loading station LS to the unloading station US, and then stop with one article pusher at the inlet side of the unloading station. The article pushers are spaced apart along the chains of the pusher conveyor a distance such that, when one article pusher such as PCb is dwelling at the unloading station, a preceeding article pusher PCa is positioned at the inlet side of the loading station, as shown in FIGS. 1 and 2. With one article pusher PCa at the inlet side of the loading station and a second article pusher PCb at the inlet side of the unloading station, the third article pusher PCc is located on the lower return run, as shown in FIG. 2.

The chains of the control conveyor CC1 have an upper run extending from the sprockets 32 at the loading station LS along the generally horizontal path past the unloading station US to the outlet sprockets 33 and a lower return run and at least one and preferably two lead article control fingers designated CC1a and CC1b at spaced locations therealong. Similarly, the other control conveyor CC2 has a generally horizontal upper run extending from the loading station past the unloading station to the outlet sprocket, and a lower return run and a plurality of lead article control fingers CC2a and CC2b at spaced locations therealong. The upper run of the control conveyors must extend from the inlet side of the loading station LS at least past the outlet side of the unloading station US and the lead article control fingers are spaced apart along the respective control conveyor a distance somewhat greater than the spacing of the pusher fingers on the pusher conveyor. As more fully described hereinafter, one control conveyor such as CC1 is operated during assembly of one group and transfer of that group to the unloading station, and the other control conveyor is operated during assembly and transfer of a succeeding group of articles. When a control conveyor is operated to transfer a group of articles to the loading station, it is stopped in a position with one of the lead article control fingers at a home position adjacent the inlet side of the loading station, as shown at CC2a in FIG. 1.

The feed conveyor FC is driven in continuous fashion by a drive motor 74 (FIG. 5) and feeds articles in succession to the loading station LS. The feed conveyor is of the endless type and as shown, comprises a set of four endless chains 71 each having a generally horizontally upper run extending from inlet sprockets (not shown) over outlet sprockets 72 mounted on a shaft 73 for rotation about a generally horizontal axis. The outlet sprockets 72 of the feed conveyor are arranged such that the upper runs of the chains 71 are disposed in a level above the loading station and the carrier chains extend downwardly around the sprockets 72 past the loading station to a lower return run. A plurality of article carrier elements 75 are attached to the carrier chains 71 at uniformly spaced locations therealong and, in the preferred embodiment illustrated, the article carrier elements each have an upper article support face 75a that is inclined downwardly and forwardly at an acute angle to the horizontal as the carrier elements move along the upper run of the carrier chain, and an article stop face 75b that extends transverse to the support face at the lead end of the support face. As best shown in FIG. 2, the article carrier elements are fixed to spaced links of the chains 71 so that the carrying face 75 is inclined downwardly and forwardly at an acute angle to the horizontal as they move with the carrier chain along the upper run, and the support face is inclined at substantially the same angle to a plane tangent to the outlet sprocket wheel 72 as the carrier elements move downwardly around the sprocket wheel past the loading station LS. As best shown in FIG. 4, the feed conveyor sprockets 72 interleave somewhat with the inlet sprockets of the pusher conveyor and the first and second control conveyors, so that the articles A are deposited by the feed conveyor at the inlet ends of the upper runs of the pusher conveyors and control conveyors. As best shown in FIG. 2 the article support faces 75a of each article carrier element 75 moves to a progressively more upright position as the article carrier elements move downwardly around the outlet sprocket 72 and the support face moves beyond an upright position so as to be inclined upwardly and forwardly as the carrier elements move past loading station LS. When the articles engage the upper run of the conveyors at the loading station, movement of the articles with the feed conveyor is interrupted and the upwardly and forwardly inclined support faces 75a cam the articles along the pusher conveyor path, to provide space for deposit of a succeeding article at the loading station. Stationary cams 78 are advantageously provided at the inlet side of the loading station at locations intermediate the feed conveyor sprockets 72, to aid in advancing the articles along the pusher conveyor path. In addition, air nozzles 79 are advantageously provided in the cams 78 at a location to direct a jet of air against the upper trail side of each article as they are deposited at the loading station.

Article sensing means 81 are provided for sensing articles as they are deposited by the feed conveyor FC at the loading station LS. The article sensing means can be of any suitable type and may be of for example, comprise a sonic detector or a photoelectric detector. For reasons which become apparent hereinafter, the sensor means is arranged to produce an article signal each time it senses an article on the feed conveyor as the article carriers move downwardly around the outlet sprocket 72, at a location somewhat in advance of deposit of the article at the loading station. The control conveyors CC1 and CC2 are operated alternately during deposit of successive groups of articles. Thus, one of the control conveyors such as CC1 is driven to advance a lead article control finger thereon in step fashion along the path away from the loading station, as the feed conveyor FC feeds successive articles of one group to a loading station and, when a number of articles corresponding to that group have been fed to the loading station, the pusher conveyor PC and the control conveyor CC1 are driven substantially in unison to advance a group of articles to the unloading station US. The second control conveyor CC2 is driven in to advance a lead article control finger thereon along the path away from the loading station as the feed conveyor feeds successive articles of the next succeeding group to the loading station and, when a number of articles corresponding to the next succeeding group has been fed to the loading station, the pusher conveyor PC and the control conveyor CC2 are driven substantially in unison to advance the succeeding group of articles to the unloading station.

Figure 7:
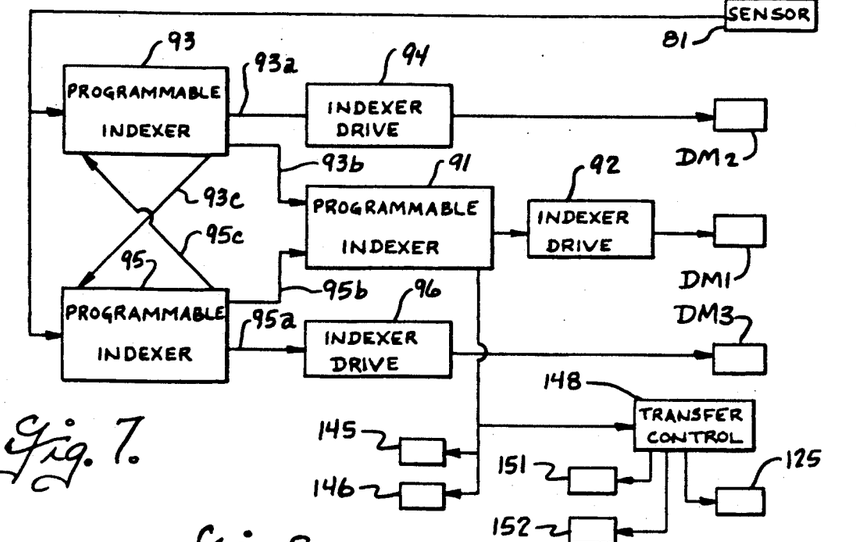
FIG. 7 is a schematic diagram of the controls for the group forming and transfer apparatus.

In the preferred embodiment illustrated the drive means DM1, DM2 and DM3 for driving the shafts 42, 41 and 43 respectively, are individual electric drive motors operated under the control of programmable indexers responsive to the article sensor 81. The motors DM1-DM3 may be electric stepping motors or servomotors and, as schematically illustrated in FIG. 7, drive motor DM1 is operated under the control of programmable indexer 91 and indexer drive 92; drive motor DM2 is operated under the control of a programmable indexer 93 and indexer drive 94, and drive motor DM3 is operated under the control of a programmable indexer 95 and indexer drive 96. Signals from the article sensor 81 are supplied to programmable indexers 93 and 95 and the indexers 93 and 95 are arranged so that they operate alternately to drive their associated drive motor during assembly and transfer of alternate groups of articles. Thus, during assembly of one group of articles, one of the programmable indexers such as 93 is enabled to receive article signal from sensor 81 while the other programmable indexer 95 is on hold and does not respond to article signals from sensor 81 and, during assembly of the next succeeding group of articles, programmable indexer 95 is enabled to receive article signals from sensor 81 and programmable indexer 93 is on hold and does not respond to article signals from sensor 81.

Figure 8:
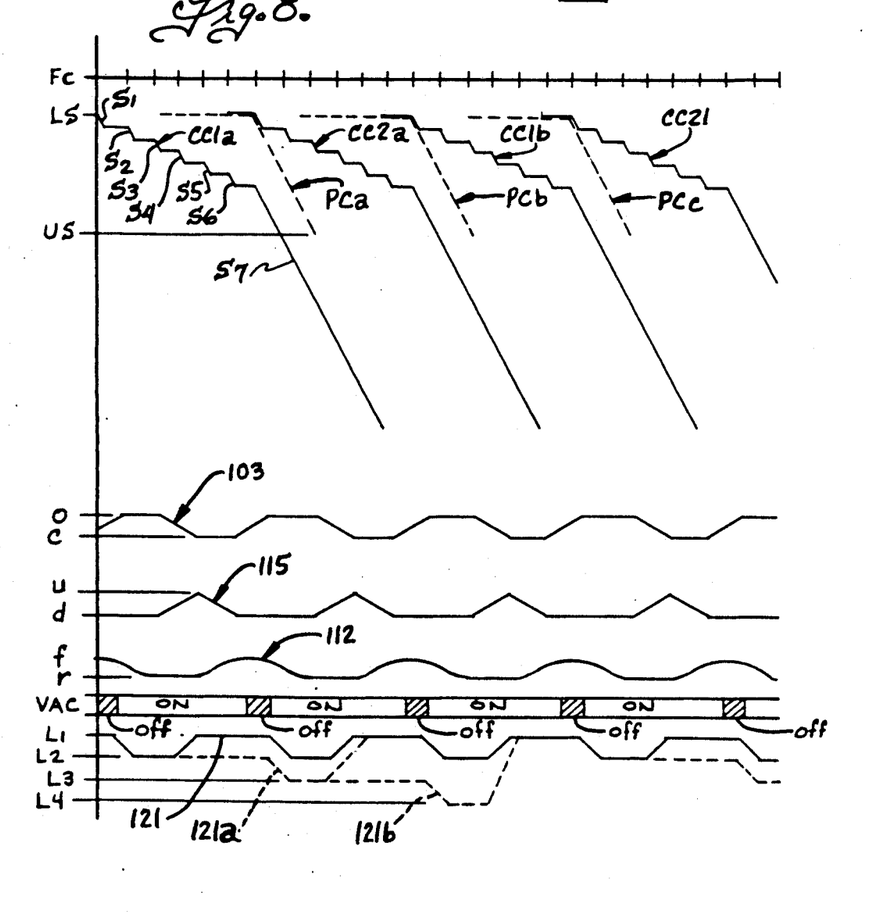
FIG. 8 is a timing diagram of the group forming and transfer apparatus.

In the timing diagram of FIG. 8, the marks on the line designated FC indicate the times at which the sensor 81 detects an article on the feed conveyor in advance of the loading station and produces an article signal. The solid lines labeled CC1a, CC2a, CC1b and CC2b illustrate movement of the respective control fingers from the loading station LS toward the unloading station US and the dotted lines designated PCa, PCb and PCc illustrate movement of the respective pusher conveyor fingers from the loading station LS to the unloading station US. As graphically illustrated in FIG. 8, one of the control conveyor CC1 has come to a stop prior to feeding of the first article of a group to the loading station, with the finger CC1a in a home position at the inlet side of the loading station LS. As the sensor 81 senses the first article in the group, indexer 93 feeds a signal through 93a to indexer drive 94 and drive motor DM2 to advance conveyor CC1 through an initial step designated S1 in FIG. 8, sufficient to move the control finger CC1a from a position at the inlet side of the loading station to a position spaced from the loading station a distance sufficient to receive the first article of a group. As succeeding articles of the group are fed to the loading station, indexer 93 operates through drive 94 and drive motor DM2 to advance the control conveyor CC1 in step fashion as indicated at S2-S6 in FIG. 8. When a preselected number of articles, for example six articles, have been fed to a loading station, the indexer 93 preforms the following functions: (1) indexer 93 sends an enable signal indicated at 93c to programmable indexer 95 to enable indexer 95 to respond to a succeeding series of article signals from sensor 81; (2) indexer 93 goes on hold and continues to operate the drive motor DM2 to drive the control conveyor CC1 trough a transfer step indicated at S7 in FIG. 8. (3) indexer 93 supplies a signal through 93b to the programmable indexer 91 at the start of the transfer step S7, to operate the drive motor DM1 and drive the pusher conveyor PC and advance pusher finger PCa as illustrated through a transfer step in FIG. 8. Programmable indexer 91 is arranged to operate the drive motor DM1 to drive the pusher conveyor PC at substantially the same speed as the control conveyor CC1 during transfer of the group of articles from the loading station to the unloading station. As graphically illustrated in FIG. 8, the pusher conveyor PC stops when one pusher finger PCa reaches the inlet side of the unloading station designated US in FIG. 8. The pusher fingers are spaced apart along the pusher conveyor a distance such that the second pusher finger PCb on the pusher conveyor stops in a home position at the inlet side of the loading station LS, when the preceding pusher finger PCa stops at the unloading station. As illustrated at S7 in FIG. 8, drive of the control conveyor CC1 is continued after the pusher conveyor stops, to advance the control finger CC1a past the unloading station, and indexer 93 stops the control conveyor CC1 when the next succeeding finger CC1b reaches a home position at the inlet side of the loading station LS.

As previously described, when the programmable indexer 93 has received a preselected number of article signals corresponding to the number of the first group, it goes on hold and sends an enable signal through 93c to the programmable indexer 95 so that the indexer 95 is enabled to respond to a succeeding series of article signals from sensor 81 during deposit of the next succeeding group of articles. As illustrated in FIG. 8 the second control conveyor CC2 comes to a stop with one finger CC2a in a home position at the inlet side of the loading station prior to feeding of the first article of the next succeeding group, and indexer 95 operates the drive motor DM3 to advance the second control conveyor CC2 in step fashion as indicated on the stepped line CC2a in FIG. 8, until the number of articles corresponding to the succeeding group have been deposited at the loading station. At that time, indexer 95 performs the following functions: (1) indexer 95 sends an enable signal through 95c to programmable indexer 93 to enable indexer 93 to respond to the succeeding article signals from sensor 81; (2) indexer 95 goes on hold and continues to operate drive motor DM3 to drive the second control conveyor CC2 through a transfer step S7 and (3) indexer 95 feeds a signal through 95b to indexer 91 to operate drive motor DM1 and drive the pusher conveyor to advance a second pusher finger PCb through a transfer step. Thus, one control conveyor such as CC1 is operated in step fashion as the feed conveyor feeds successive articles of a first group to the loading station and, when a number of articles corresponding to the number in the first group has been fed to the loading station, the pusher conveyor and the control conveyor are driven in unison to advance the group of articles to the unloading station. The other control conveyor CC2 is driven in step fashion as the feed conveyor feeds successive articles of the next succeeding group to the loading station and, when the number of articles comprising the next succeeding group has been fed to the loading station, the control conveyor CC2 and pusher conveyor PC are driven in unison to advance that group to the unloading station.

As best shown in FIG. 4 article support pads 31 are advantageously provided on the upper side of the links of the chains of the control conveyor CC1, at the trail side of the control fingers CC1a and CC2b and similarly article support pads 35 are advantageously provided on the upper side of the links of the chain of control conveyor CC2, at the trail side of the fingers CCa and CC2b. The pads 31 and 35 are arranged to underlie and support the articles at a level slightly above the level of the other sidewise adjacent chains, to aid in advancing the articles away from the loading station to the unloading station and to also avoid dragging of the articles on the other sidewise adjacent chains.

Figure 3:
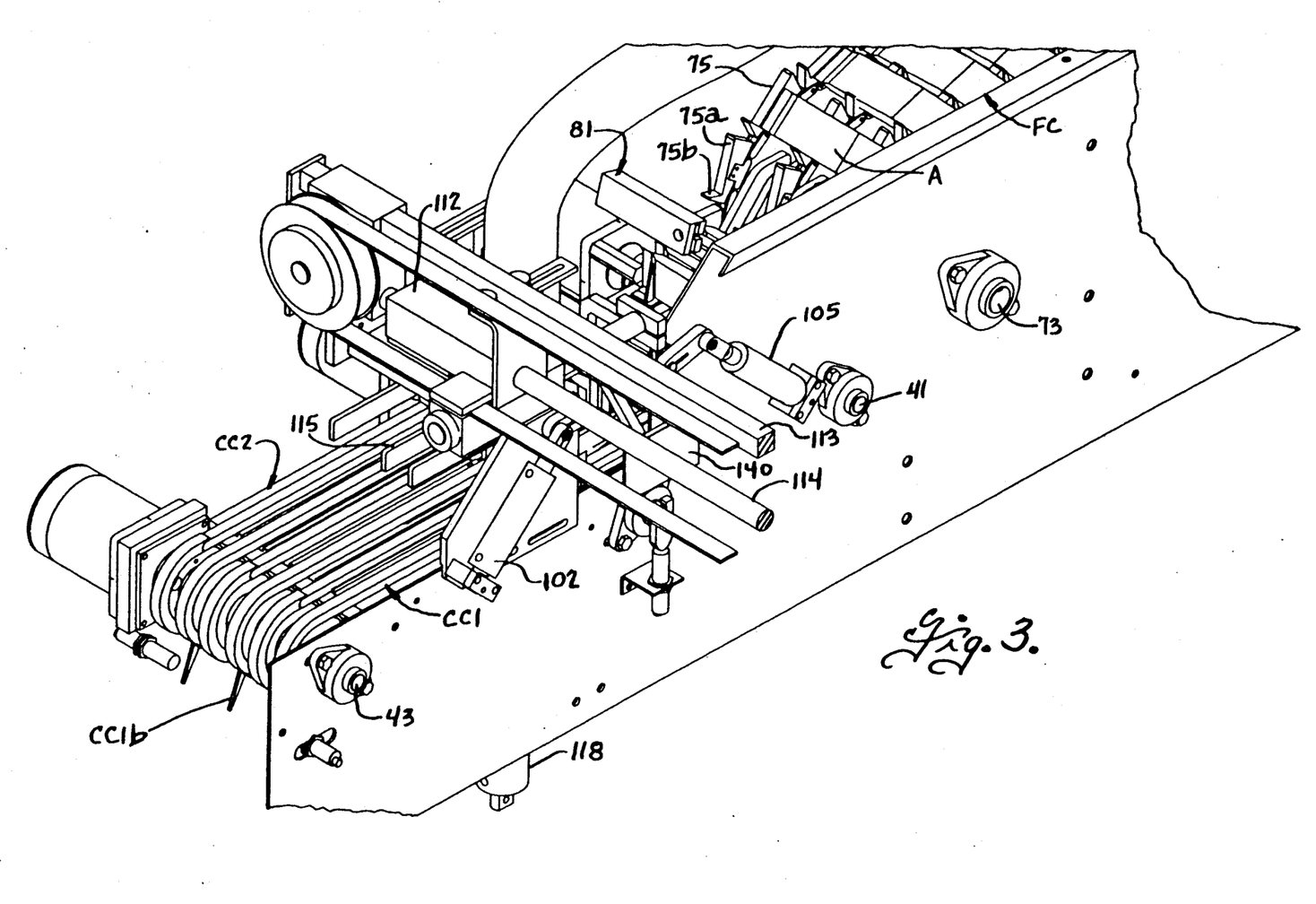
FIG. 3 is a fragmentary isometric view illustrating the group forming and transfer apparatus viewed from the side opposite the side shown in FIG. 1.
Figure 5:
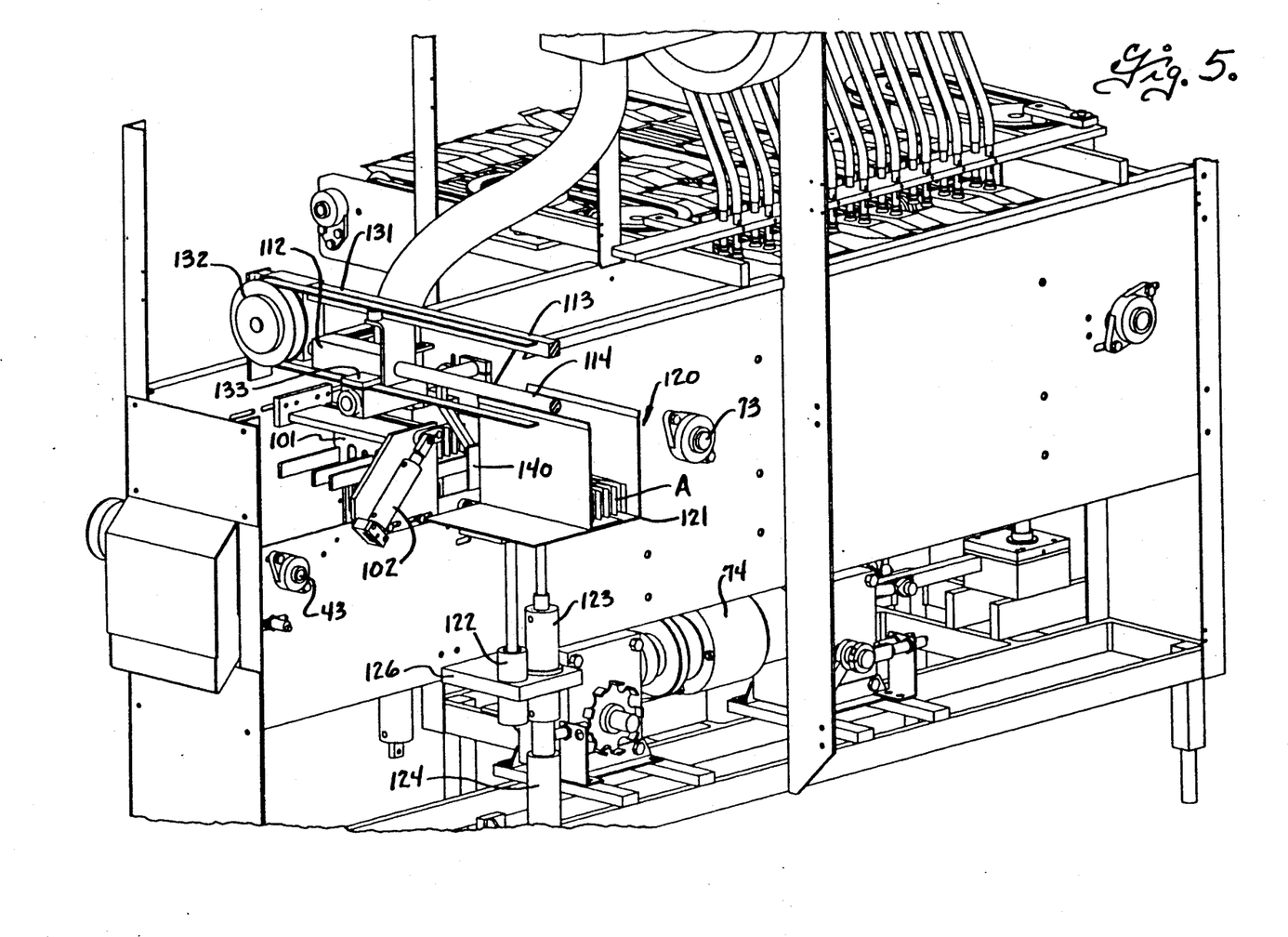
FIG. 5 is a fragmentary isometric view illustrating group transfer and stacking apparatus.

A stop gate 101 is provided at the outlet side of the unloading station to engage a lead article of each group advanced to the loading station. As shown, the stop gate 101 is mounted at 101a for swinging movement between a raised position above the path of travel of the articles A, and a lowered position as best shown in FIGS. 1 and 2, extending downwardly to engage a lead article in a group. The stop gate is operated between its raised and lowered position as by a pneumatic cylinder 102 (FIGS. 3 and 5). The stop gate 101 is advantageously provided with slots 101b (FIG. 1) to allow passage of the lead article control fingers on conveyors CC1 and CC2 past the stop gate, when the gate is in its lower position. It is contemplated that the gate be operated to its raised position only to allow the articles on the control conveyor to advance past the unloading station, in the event of a jam in the transfer of articles from the unloading station or a jam in a subsequent packaging apparatus (not shown). A guide gate 103 (FIGS. 1 and 3), is advantageously provided at the inlet side at the unloading station, for guiding the trail side of the group of articles during transfer from the unloading station. Guide gate 103 is mounted at 103a for swinging movement between a lower position as shown in FIGS. 1 and 2 and a raised position out of the path of travel of the articles along the pusher and control conveyor, by an air cylinder 105 (FIGS. 3 and 5).

The groups of articles are preferably transferred from the unloading station by a vacuum type group transfer head 111 that is mounted on a transfer shuttle 112 supported for movement along guides 113 and 114 for movement between a group load position spaced above the unloading station and a group discharge position above a group receiver 120 (FIGS. 5 and 6) laterally offset from the unloading station. A group lifting means is provided at the unloading station for raising each group of articles from the unloading station into engagement with the transfer head. The group lifting means includes a plurality of lift bars 115 mounted on a lift frame 116 for movement between a lower position disposed between chains of the group control conveyor, at a level below the tops of the conveyors, and a raised position as shown in FIGS. 1–3 spaced above the conveyors, to elevate the group of articles at the unloading station into engagement with the vacuum head 111. The group lifting means is conveniently moved between its lower and raised position by an air cylinder 118.

Figure 6:
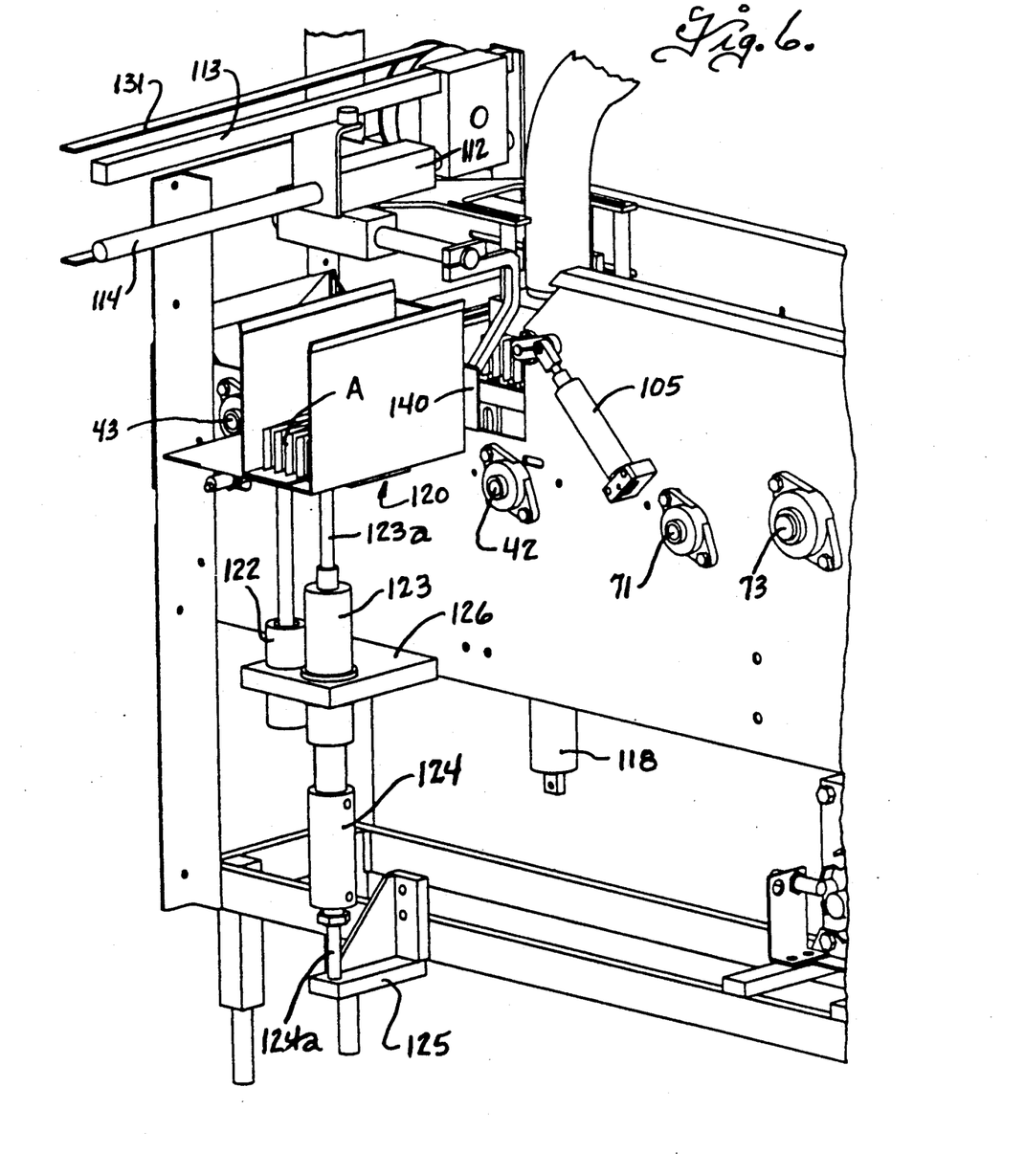
FIG. 6 is a fragmentary perspective view of the group transfer and stacking apparatus taken from a different angle and on a larger scale than FIG. 5.

As best shown in FIGS. 5 and 6, the group receiver 120 advantageously comprises a stacking elevator 121 is provided for receiving groups of articles from the group transfer head. The stacking elevator is guidably supported in a guide 122 for vertical movement and in the embodiment illustrated, dual pneumatic cylinders 123 and 124 are provided for moving the stacking elevator to different levels. The cylinders 123 and 124 are connected to each other base-to-base with cylinder 123 slidably supported in a guide 126. The rod 124a of the lower cylinder is fixed to a support 125 while the rod 123a of the upper section is connected to the elevator 121. Cylinder 124 has a preselected stroke corresponding to the height of the articles of a single layer, and cylinder 123 has a stroke about twice the stroke of cylinder 124. When both cylinders 123 and 124 are extended, the elevator is at its uppermost position L1. When lower cylinder 124 is retracted with cylinder 123 is extended, the elevator is moved to a first lower position L2 and, when cylinder 123 is retracted and cylinder 124 extended, the elevator will be moved to a second lower position L3. When both cylinders 123 and 124 are retracted, the elevator is moved to its lowest position L4 (see FIG. 8).

Any suitable means may be provided for moving the transfer head 111 between a group load position spaced above the unloading station and a group discharge position spaced above the elevator 121. The head may, for example, be oscillated through a drive including an endless toothed belt or chain 131 entrained over a pulley or sprocket 132 and operatively connected at 133 to the carriage with a crank means (not shown) for oscillating the belt. The vacuum head 111 is arranged to deposit a group of articles on the elevator when the elevator is at its upper level L1 or a lower level below its upper level L1, and article groups are discharged from the elevator when the elevator is in its fully raised position L1 by a pusher 140 mounted on the transfer carriage for reciprocation therewith. The timing of the operation of the gate 103, group lifter 115, transfer carriage 112 and elevator 121 is indicated in the timing diagram of FIG. 8. As diagrammatically illustrated in FIG. 7, the programmable indexer 91 for the pusher conveyor is arranged to apply a signal through 91b to a control valve 145 for gate operating cylinder 105 and to a control valve 146 for lift operating cylinder 118. The indexer 91 also supplies a timing signal to a group transfer control schematically illustrated at 148 in FIG. 7, to operate a drive (not shown) for the transfer carriage 112. The group transfer control is also arranged to supply timing signals to control valves 151 and 152 for elevator cylinders 123 and 124 and to a valve 125 for controlling vacuum to the head 111. As graphically guidably engage a trail side of a group of articles at the unloading station.

9. An apparatus according to claim 1 wherein said first and second group control conveyor means each have at least two lead article control fingers at spaced locations therealong.

10. Apparatus according to claim 1 including a vacuum type group transfer head mounted for movement between a group load position spaced above the unloading station and a group discharge position laterally offset from the unloading station, and group lifting means at the unloading station for raising a group of articles from the unloading station into engagement with the group transfer head.

11. An apparatus according to claim 10 including a stacking elevator below said group discharge position of said group transfer head, and means for moving said stacking elevator between a first position for receiving one group of articles from said transfer head and at least one other position spaced below said first position for receiving a succeeding group of articles.

12. An apparatus according to claim 1 wherein the pusher conveyor means and the first and second group control conveyor means each have inlet and outlet sprocket means, the inlet sprocket means of the pusher conveyor means and the first and second group control conveyor means being mounted for relative rotation about a first horizontal axis adjacent the loading station.

13. Apparatus for assembling articles in succession into generally horizontal groups of sidewise adjacent articles and for transferring the groups to an unloading station, the apparatus comprising, feed conveyor means for feeding articles in succession to an article loading station, an endless type pusher conveyor means having an upper run extending forwardly along a generally horizontal path from the article loading station to a group unloading station, the pusher conveyor means having a plurality of article pusher means at uniformly spaced locations therealong, endless type first and second group control conveyor means each having an upper run extending forwardly along said generally horizontal path from the loading station past the unloading station, the first and second group control conveyor means each having at least two lead article control fingers thereon, the pusher conveyor means and the first and second group control conveyor means each having inlet and outlet sprocket means, the inlet sprocket means of the pusher conveyor means and the first and second group control conveyor means being mounted for relative rotation about a first horizontal axis adjacent the loading station, means for sensing articles on the feed conveyor means adjacent the loading station, means for intermittently driving the first group control conveyor means to advance a lead article control finger thereon along the path away from the loading station as the feed conveyor means feeds successive articles of a first group to the loading station, means operative when a number of articles comprising the first group of articles has been fed to the loading station for driving the pusher conveyor means and the first group control conveyor means to advance the first group of articles along the path to the unloading station, means for intermittently driving the second group control conveyor means to advance an article retainer means thereon along the path away from the loading station as the feed conveyor means feed successive articles of a next succeeding group to the loading station, and means operative when a number of articles comprising the next succeeding group of articles has been fed to the loading station for driving the pusher conveyor means and group control conveyor means to advance the next succeeding group of articles along the path to the loading station.

14. Apparatus according to claim 13 wherein said first and second group control conveyor means are constructed and arranged to support articles on the upper run thereof with the lower side of the articles above the upper run of the endless pusher conveyor means.

15. An apparatus according to claim 13 wherein the article pusher means are spaced apart along the pusher conveyor means a distance such that one pusher means is at an inlet side of the loading station when a preceding pusher means is at an inlet side of the unloading station.

16. An apparatus according to claim 13 wherein the feed conveyor means includes means operative as it feeds each article to the loading station for advancing that article along the path a distance sufficient to allow feeding of a succeeding article to the loading station.

17. An apparatus according to claim 13 wherein said feed conveyor means includes a sprocket wheel means at the inlet side of the loading station and endless carrier chains having a forward generally horizontal upper run disposed at a level above the loading station, the carrier chains extending downwardly from the upper run around the sprocket wheel means past the loading station to a lower return run, and a plurality of article carrying elements attached to the carrier chains at uniformly spaced locations therealong, the article carrying elements each having an article support face that is inclined downwardly and forwardly as the carrying elements move along the upper run of the feed conveyor means and an article stop face extending transverse to the support face at a lead end thereof, and means at the loading station engageable with articles on the feed conveyor means as the article carrying elements move past the loading station for advancing each article along the path a distance sufficient to allow feeding of a succeeding article to the loading station.

18. An apparatus according to claim 13 including a stop gate at an outlet side of the unloading station adapted to engage a lead article in a group advanced to the unloading station.

19. Apparatus according to claim 13 including a vacuum type group transfer head mounted for movement between a group load position spaced above the unloading station and a group discharge position laterally offset from the loading station, and group lifting means at the unloading station for raising a group of articles from the loading station into engagement with the group transfer head.

20. An apparatus according to claim 13 including a stacking elevator below said group discharge position of said group transfer head, and means for moving said stacking elevator between a first position for receiving one group of articles from said transfer head and at least one other position spaced below said first position for receiving a succeeding group of articles.

21. An apparatus for assembling articles in succession into generally horizontal groups of sidewise adjacent articles and for transferring the groups to an unloading station, the apparatus comprising, feed conveyor means for feeding articles in succession to an article loading station, an endless type pusher conveyor means having inlet and outlet sprocket means and an upper run extending along a generally horizontal path from the artiillustrated on lines designated 103 and 115 in FIG. 8, the programmable indexer 91 is arranged to apply timing signals to move the gate 103 from its open position O to its closed position C and to raise the lift elevator 115 from its down position d to its raised position u, when the pusher conveyor is advanced to a position in which one of the pusher fingers is at the inlet side of the unloading station. The group transfer mechanism is normally in its retracted position r as shown on the line 112 in FIG. 8 and, when the group is advanced to the unloading station, the transfer mechanism is operated through a cycle to move the transfer carriage 112 from its retracted or group load position r overlying the unloading station to a forward group discharge position f overlying the elevator. As indicated on the line 111 in FIG. 8, vacuum to the group transfer head is on when the group transfer head is in its retracted position r overlying the unloading station to pick up a group of articles and the vacuum is momentarily turned off when the group transfer head is in its forward position f overlying the elevator 121 to discharge the group onto the elevator 121.

The apparatus can be operated to transfer articles from the elevator to a subsequent packaging or cartoning apparatus (not shown) in either a single layer or in two layers or three layers. The elevator 121 is operated in timed relation with the group transfer carriage 112 and, when it is desired to deliver groups of items in a single layer from the elevator, the elevator is moved to level L2 during retraction of the group transfer head 30 from its forward position f to its retracted position r over the unloading station, and the elevator is raised to the upper level L1 when the group transfer head is moved forwardly from a position overlying the unloading station to a position overlying the elevator as graphically illustrated in the solid line designated 121 in FIG. 8. Thus, the pusher 140 on the group transfer head will push off one group of articles from the elevator while the transfer head moves to a position depositing a succeeding group of articles on the elevator. When it is desired to deliver groups of articles in two layers from the elevator, the elevator is moved from level L2 downwardly to a level L3 indicated by the dash line 121a in FIG. 8 during delivery of a second group of articles from the unloading station to the elevator and the elevator thereafter moved back to its upper position L1 to discharge the groups of articles from the elevator. When it is desired to deliver articles in three layers from the elevator, the elevator is moved from level L3 to level L4 before it is returned to its upper level L1, as indicated by the broken line 121b in FIG. 8.

The embodiments of the invention in which an exclusive property or privilege is claimed are defined as follows:

1. Apparatus for assembling articles in succession in generally horizontal groups of sidewise adjacent articles and for transferring the groups to an unloading station, the apparatus comprising, feed conveyor means for feeding articles in succession to an article loading station, an endless type pusher conveyor means having an upper run extending forwardly along a generally horizontal path from the article loading station to a group unloading station, the pusher conveyor means having a plurality of article pusher means at spaced locations therealong, endless type first and second group control conveyor means each having an upper run extending forwardly along said generally horizontal path from the loading station past the unloading station, the first and second group control conveyor means each having at least one lead article control finger thereon, means for intermittently driving the first group control conveyor means to advance a lead article control finger thereon along the path away from the loading station as the feed conveyor means feeds successive articles of a first group to the loading station, means operative when a number of articles comprising the first group of articles has been fed to the loading station for driving the pusher conveyor means and the first group control conveyor means to advance the first group of articles along the path to the unloading station, means for intermittently driving the second group control conveyor means to advance a lead article control finger thereon along the path away from the loading station as the feed conveyor means feeds successive articles of a next succeeding group to the loading station, and means operative when a number of articles comprising the next succeeding group of articles has been fed to the loading station for driving the pusher conveyor means and the second group control conveyor means to advance the next succeeding group of articles along the path to the unloading station.

2. An apparatus according to claim 1 including means for sensing articles on the feed conveyor means adjacent the loading station.

3. Apparatus according to claim 1 wherein said first and second group control conveyor means are constructed and arranged to support articles on the upper run thereof with the lower side of the articles above the upper run of the endless pusher conveyor means.

4. An apparatus according to claim 1 wherein the article pusher means are spaced apart along the pusher conveyor a distance such that one pusher means is at an inlet side of the loading station when a preceeding pusher means is at an inlet side of the unloading station.

5. An apparatus according to claim 1 wherein the feed conveyor means includes means operative as it feeds each article to the loading station for advancing that article along the path a distance sufficient to allow feeding of a succeeding article to the loading station.

6. An apparatus according to claim 1 wherein said feed conveyor means includes a sprocket wheel means at the inlet side of the loading station and a plurality of sidewise adjacent endless carrier chains having a forward generally horizontal upper run disposed at a level above the loading station, the carrier chains extending downwardly from the upper run around the sprocket wheel means past the loading station to a lower return run, and a plurality of article carrying elements fixed to the carrier chains at uniformly spaced locations therealong, the article carrying elements each having an article support face that is inclined downwardly and forwardly at an acute angle to the horizontal as the carrying elements move along the upper run of the carrier chain and an article stop face extending transverse to the support face at a lead end thereof.

7. An apparatus according to claim 1 including a stop gate at an outlet side of the unloading station adapted to engage a lead article in a group advanced to the unloading station.

8. An apparatus according to claim 7 including a guide gate at an inlet side of the unloading station, means operative after the pusher conveyor means has advanced a group of articles to the unloading station for moving the guide gate to a position extending crosswise of said path at the inlet side of the unloading station to cle loading station to a group unloading station, the pusher conveyor means having a plurality of article pusher means at uniformly spaced locations therealong, first and second endless type group control conveyor means each having inlet and outlet sprocket means and an upper run extending forwardly along said generally horizontal path, the first and second group control conveyor means each having at least one lead article control finger thereon, the inlet sprocket means of the pusher conveyor means and the inlet sprocket means of the first and second group control conveyor means being mounted for relative rotation about a first horizontal axis adjacent the loading station, the outlet sprocket means of the pusher conveyor means being mounted for rotation about a second horizontal axis, the outlet sprocket means of the first and second group control conveyor means being mounted for relative rotation about a third horizontal axis, pusher conveyor drive motor means for driving the pusher conveyor means, first and second drive motor means for respectively driving the first and second group control conveyor means, article sensing means for sensing articles as they are fed to the loading station, means for intermittently operating the first drive motor means to advance a lead article control finger on the first group control conveyor means along the path away from the loading station as the feed conveyor means feeds successive articles of a first group to the loading station, means operative when a number of articles comprising the first group has been fed to the loading station for operating the pusher conveyor drive motor means and the first drive motor means to advance the first group to the loading station, means for intermittently operating the second drive motor means to advance a lead article control finger on the second group control conveyor means away from the loading station as the lead conveyor means feeds successive articles of a second group to the loading station, and means operative when a number of articles comprising its second group has been fed to the loading station for operating the pusher conveyor drive motor means and the second drive motor means to advance the second group to the loading station.

22. An apparatus according to claim 21 wherein the pusher conveyor means has three pusher means thereon spaced apart along the pusher conveyor means a distance such that one pusher means is at an inlet side of the loading station when a preceding pusher means is at an inlet side of the unloading station.

* * * * *